United States Patent
Cannedy et al.

(10) Patent No.: US 7,698,010 B2
(45) Date of Patent: Apr. 13, 2010

(54) METHODS, SYSTEMS AND COMPUTER PROGRAM PRODUCTS FOR ALTERING VIDEO IMAGES TO AID AN OPERATOR OF A FASTENER INSERTION MACHINE

(75) Inventors: Jeff Cannedy, Oakdale, CA (US); Thomas Clark Boster, Oakdale, CA (US)

(73) Assignee: Haeger, Inc., Oakdale, CA (US)

( * ) Notice: Subject to any disclaimer, the term of this patent is extended or adjusted under 35 U.S.C. 154(b) by 629 days.

(21) Appl. No.: 11/240,961

(22) Filed: Sep. 29, 2005

(65) Prior Publication Data

US 2006/0069462 A1    Mar. 30, 2006

Related U.S. Application Data

(60) Provisional application No. 60/614,663, filed on Sep. 29, 2004.

(51) Int. Cl.
  *G06F 19/00*  (2006.01)
(52) U.S. Cl. ............................. 700/96; 700/145; 382/152
(58) Field of Classification Search .................. 700/96, 700/145, 169, 182, 247, 248, 259, 97, 174; 156/379; 409/134, 67, 11, 16, 137; 382/152; 250/559.45
See application file for complete search history.

(56) References Cited

U.S. PATENT DOCUMENTS

| | | | | |
|---|---|---|---|---|
| 4,823,396 | A * | 4/1989 | Thompson | 382/152 |
| 5,426,725 | A | 6/1995 | Kilgore | |
| 5,807,449 | A * | 9/1998 | Hooker et al. | 156/64 |
| 5,877,961 | A * | 3/1999 | Moore | 700/180 |
| 5,968,297 | A * | 10/1999 | Hooker et al. | 156/64 |
| 6,059,494 | A * | 5/2000 | Susnjara | 409/134 |
| 6,111,601 | A * | 8/2000 | Adachi | 348/92 |
| 6,115,645 | A * | 9/2000 | Berar | 700/121 |
| 6,313,847 | B1 | 11/2001 | Carlsen | |
| 6,325,697 | B1 * | 12/2001 | Gottschalk | 451/5 |
| 6,501,849 | B1 * | 12/2002 | Gupta et al. | 382/141 |
| 6,532,022 | B1 | 3/2003 | Ahmad | |
| 6,647,840 | B2 * | 11/2003 | Luik | 82/118 |
| 6,747,665 | B1 | 6/2004 | Stoval, III | |
| 6,762,426 | B1 * | 7/2004 | Gilliam | 250/559.12 |
| 6,876,360 | B2 | 4/2005 | Sasaki | |
| 7,324,682 | B2 * | 1/2008 | Wasserman | 382/145 |
| 2002/0122581 | A1 | 9/2002 | Erickson | |
| 2003/0202091 | A1 * | 10/2003 | Garcia et al. | 348/86 |
| 2004/0031567 | A1 * | 2/2004 | Engelbart et al. | 156/379 |
| 2004/0189631 | A1 | 9/2004 | Kazi | |
| 2004/0240607 | A1 * | 12/2004 | Moermond et al. | 378/53 |

(Continued)

*Primary Examiner*—Kidest Bahta
(74) *Attorney, Agent, or Firm*—Mark D. Miller; Marcus N. DiBuduo

(57) ABSTRACT

The present invention provides methods, systems and computer program products for altering video images including superimposing objects onto the images, particularly addressed to identifying fastener insertion locations onto displayed images of a work pieces. The invention is capable of importing an image of a work piece contained in a computer file, displaying the image, and altering the displayed image and/or superimposing objects onto the image to show the location(s), sequence(s) and/or type(s) of fasteners to be inserted onto the displayed work piece according to operator input and instructions. After each insertion is completed, the display is again altered to show the completion. During use, the system is capable of tracking the fastener installations and updating the video display to show the current status of insertions on the work piece.

40 Claims, 5 Drawing Sheets

U.S. PATENT DOCUMENTS

2004/0247172 A1    12/2004  Mitsui
2004/0259708 A1*   12/2004  Harding et al. ............. 493/350
2005/0103760 A1*   5/2005   Kaplan et al. .......... 219/121.68

* cited by examiner

METHODS, SYSTEMS AND COMPUTER PROGRAM PRODUCTS FOR ALTERING VIDEO IMAGES TO AID AN OPERATOR OF A FASTENER INSERTION MACHINE

This application claims the benefit of U.S. Provisional Application No. 60/614,663 filed on Sep. 29, 2004 which is incorporated herein by this reference.

BACKGROUND OF THE INVENTION

The present invention relates to methods, systems and computer program products for altering video images including superimposing objects onto video images, and utilizing said objects and images for use in various manufacturing operations with a machine. The invention is particularly directed to methods, systems, and computer program products that are capable of receiving an image (e.g. digital picture file) of a given work piece (such as a metallic automobile door frame), displaying the image on a video screen, establishing object locations on the image of said work piece for different components to be attached, installed, cut, placed or adhered (e.g. manufacturing operations) to the work piece, and use of said objects and images to aid a machine operator in the manufacturing of the work piece. One novel feature of the present invention is that the software is capable of establishing manufacturing operation locations on an inputted image of a work piece, such as a digital photograph and/or computer-rendered representation of the work-piece. Thus, files containing pictures of things taken by ordinary digital cameras or scanners may be used as input, and these images are manipulated by the invention to display critical location information according to user input. The invention does not require a three-dimensional computer model or a computer aided drawing (CAD) as input. Secondly, this invention is novel is because the software alters the image and/or displays the objects over the image(s) in a sequenced order, so as to guide the operator through the manufacturing process at the machine in real-time.

In the field of manufacturing parts for use in industry, it is common to bend, cut and shape sheets made of metal or other rigid materials into particularly shaped parts which are then used in the construction of a final product (such as the panels making up the box of a desktop computer, the parts needed to assemble an automobile door, etc.). Many such parts also require that holes be cut in certain places, that flanges be established at other locations, and that fasteners be attached to the part. Such fasteners include such things as nuts, threaded studs, rivets, standoffs and the like.

Numerous fastener insertion machines are known in the art. These machines generally include presses or rams that are capable of imparting hundreds if not thousands of pounds of pressure. Uniquely designed tooling is provided to support a given fastener in such a machine, a work piece is set into place adjacent to the tooling, and a ram or anvil is used to insert the fastener into the work piece using the requisite amount of pressure. Folds, bends or holes may also be formed in the work piece using similar equipment. In some cases, the design of the work piece requires that these processes be intermixed in a particular sequence. However, in many cases, all of the folds, bends or cuts are made to the work piece before any fasteners are inserted. It is common for such work pieces to be fabricated at one location, and then taken to another location for insertion of fasteners.

In those cases where the work piece is complete except for the insertion of fasteners, it is often desirable to illustrate and display the type, location and sequence of the insertion of the various fasteners onto the work piece prior to performing and during performance of the actual fastener insertion work. Such illustrative work may be part of the design process so that proper machinery may be set up in a particular sequence for efficient and timely fastener insertions. Once the sequence is established, the illustrative work may be provided at the assembly location so that machine operators may learn and/or review the sequence of tasks during the production process. Hand drawn illustrations, paper-copy print-outs of computer-rendered illustrations, and/or exemplary completed parts are all often inadequate to clearly demonstrate where and on the work piece and in what sequence each fastener is to be inserted.

It is desirable to provide methods, computer systems and computer program products that provide video illustrations of the location, sequence and type of fasteners to be inserted onto a given work piece before and during a manufacturing process. In particular, it is desirable for an operator to be able to import an image of a given work piece into a computer system, and to then establish the location(s), sequence(s) and/or type(s) of fasteners to be inserted onto the work piece using the computer system and the imported image. It is also desirable for a user to be able to call up the images of a given work piece for which the location(s), sequence(s) and/or type(s) of fasteners to be inserted have already been established so that the user may use said images to correctly process and manufacture the work piece and learn, review or check to be sure that the fastener insertion machines are properly operated to accomplish the illustrated tasks.

SUMMARY OF THE INVENTION

The present invention provides methods, systems and computer program products for altering a video image including superimposing objects onto digital or scanned images, and more particularly to methods, systems and computer program products that are capable of importing an image (preferably digital) of a work piece contained in a computer file in a format such as .BMP or .JPEG or .PDF or the like; altering portions of the image and/or superimposing objects onto the image to show the location(s), sequence(s) and/or type(s) of fasteners to be inserted onto the displayed work piece using the image file according to operator input and instructions; displaying a video image of the work piece with the alterations; and tracking the fastener installations and updating the video display to show the current status of insertions on the work piece.

In the preferred embodiment, the user first loads an image of a work piece into the system. The system then allows the user to establish the location(s), sequence(s) and/or type(s) of fasteners to be inserted onto the illustrated work piece. The system illustrates the selected types and locations of the fasteners identified by the user and superimposes objects on, or otherwise alters the imported image of the work piece to show these locations. The user may update and/or change the sequence for fastener insertions, and cause the system to display the current sequence before and/or during a manufacturing process. Once the sequence is established, it is followed as the fasteners are inserted, with each of the symbols/objects/alterations representing a given fastener being changed from a "to be inserted" condition to a "completed" condition such as, without limitation, changing or restoring the color of the image or symbol, changing the symbol itself, placing an "X" or other designation over the symbol, or the like (see FIG. 4).

It is to be appreciated that the imported image of the work piece may be provided with or without fasteners shown in the image itself. Where no fasteners are shown, symbols or other highlighting is used by the invention to identify the locations for insertion of fasteners. In those situations where the image itself already shows some or all of the fastener insertion locations, the system is capable of highlighting those locations by such things as without limitation: changing the color of the displayed fastener before insertion, and removing the color change after insertion; superimposing a first symbol over the displayed fastener before insertion, and superimposing a second or altered symbol after insertion; altering all or a portion of the displayed image before insertion (e.g., changing the color), and returning it to an unaltered state after insertion, etc.

Once the setup for a particular work piece is prepared, the system generates a series of images, or changes to an image, showing each of the steps of the sequence and the particular fastener to be inserted during that step. These images or changes may then be used for setting up the fastener insertion machine(s), and also for training and quality assurance once the fastener insertion machine(s) is set up. In particular, the images/changes assist an operator in knowing which fastener is to be inserted next in sequence, reducing the chances of operator error (i.e., making it less likely than the operator will miss insertion of a fastener, insert the wrong fastener, insert a fastener in the wrong place, etc.). The system should also improve the speed and efficiency of operators inserting fasteners into work pieces. In addition, because a signal is received by the system each time an insertion process is accomplished by the machine, the system is able to track (count) the actual insertions and update the displayed image, allowing the operator to confirm where he/she is with just a glance at the displayed image. This allows the user to stop, take a break, or otherwise be interrupted and then be able to return to work and pick up precisely where he/she left off.

It is therefore an object of the present invention to provide systems for use with fastener insertion machines having a video display of an image of a work object onto which locations for fastener insertions are superimposed or otherwise indicated according to user input, the system being capable of updating the superimposed or otherwise indicated locations as the fasteners are actually inserted.

It is another object of the present invention to provide methods for establishing the locations and sequences for insertions of fasteners on a work piece that are superimposed or otherwise indicated on a visual image of the work piece.

It is another object of the present invention to provide methods for monitoring and tracking the insertions of fasteners on a work piece, and displaying an updated status of such insertions using symbols that are superimposed on, or other alterations to, a visual image of the work piece.

Additional objects of the invention will be apparent from the detailed description and the claims herein.

DETAILED DESCRIPTION

The system of the present invention includes a computer processor running one or more computer programs, at least one video display, at least one operator input device, and at least one connection to a machine—preferably a fastener insertion machine.

Figure 1:
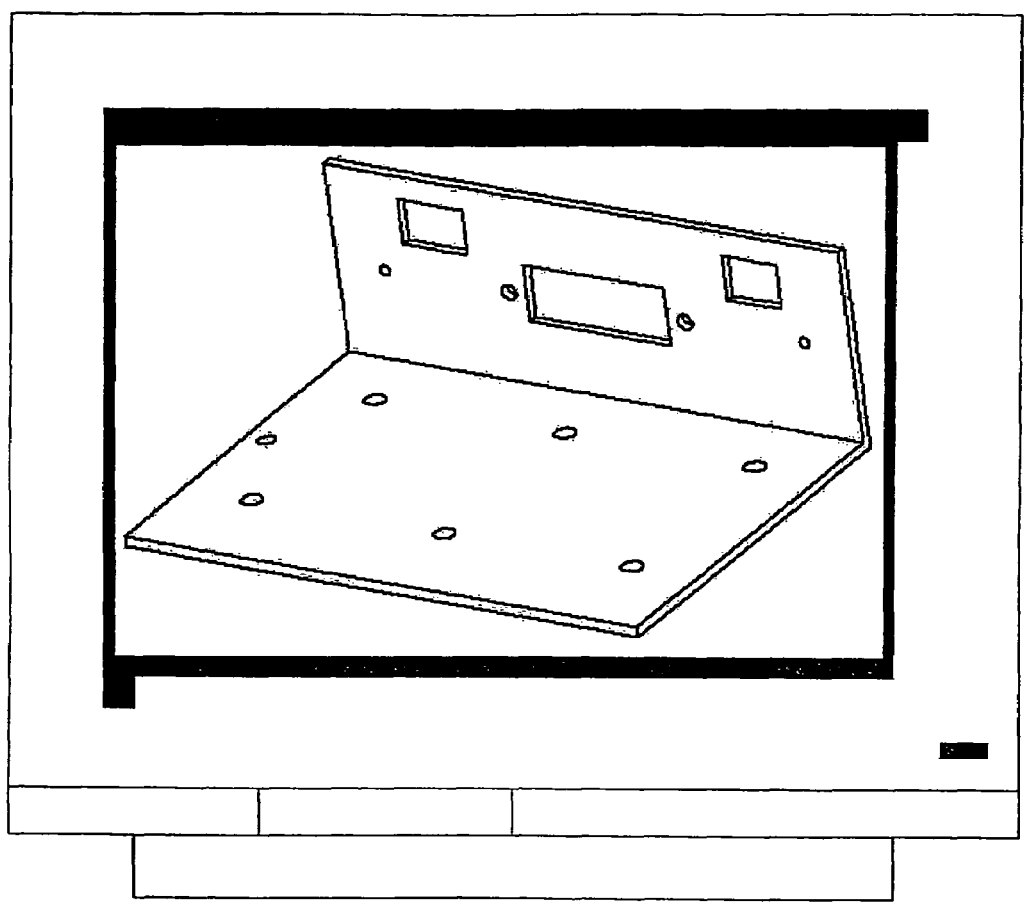
FIG. 1 is a view of a video display of the present invention showing an uploaded image of an exemplary work piece.
Figure 2:
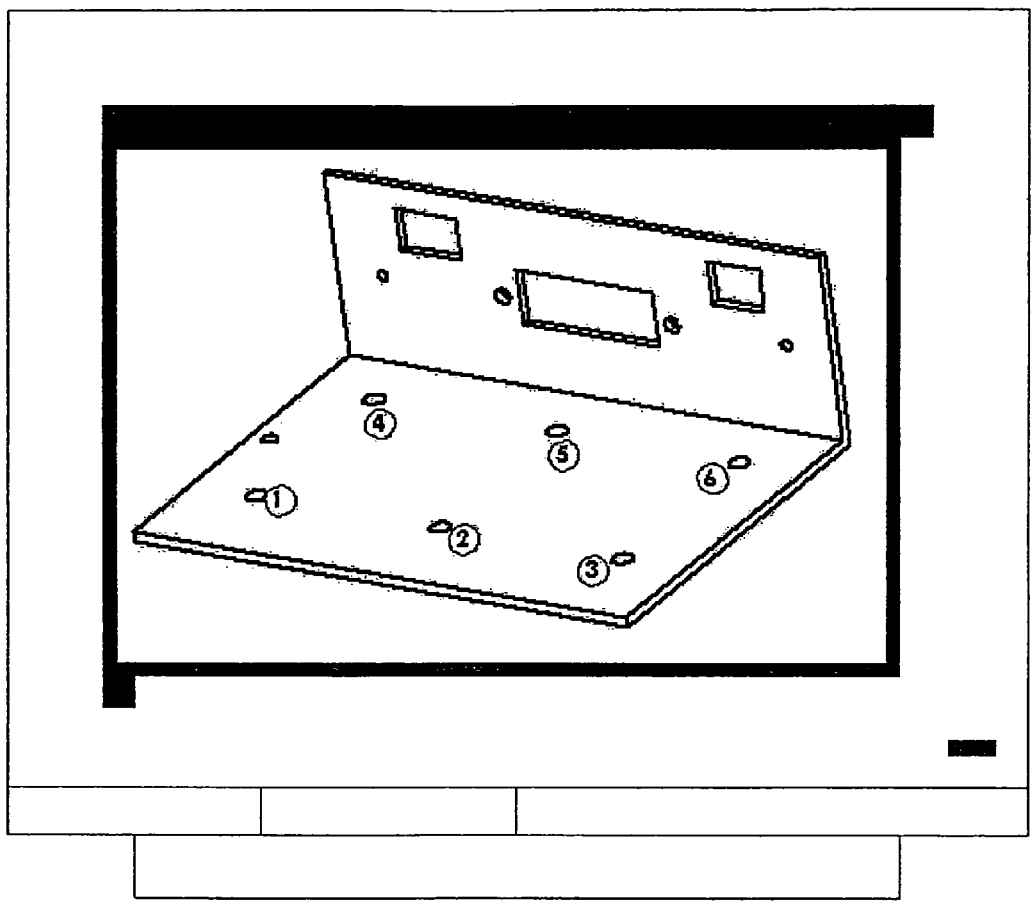
FIG. 2 is a view of the video display of FIG. 1 showing exemplary superimposed object location identifiers produced by the system according to selections made by an operator.

Referring to the exemplary embodiment illustrated in the drawings, but without limiting the scope of the claims or the scope of potential applications of the present invention, in use, an operator first obtains a computer file containing an image (preferably digital) of a subject work piece by, for example, taking a digital picture of the work piece. This image (file) is imported into the system of the present invention so that it may be displayed on a video screen, as shown in the exemplary work piece displayed in FIG. 1. The system then provides a menu from which the user may select one of many different types of fasteners, with many standard and custom descriptions available to choose from to identify a particular type of fastener. The user is then able to select a location on the displayed image of the work piece for the selected fastener to be installed. The first fastener location selected is identified as the first location to be installed during manufacturing. The second fastener location selected is identified as the second location, and so on. An exemplary set of user-defined installation locations are illustrated by the numerals (1-6) shown on the work piece displayed in FIG. 2. These locations may also be highlighted in other way such as without limitation altering all or a portion of the displayed image, changing the color of all or a portion of the displayed image, making all or a portion of the displayed image blink or flash, etc.

The user may establish one or many different locations for a given type of fastener to be installed. The user may then select a different type of fastener and again select one or many different locations for the different fastener to be installed. The system highlights the selected fastener locations on the displayed image, illustrating the sequence and location of the different types of fasteners in different ways so that the user may tell them apart, such as without limitation, by using different colors, symbols, signals, sounds or the like.

Figure 3:
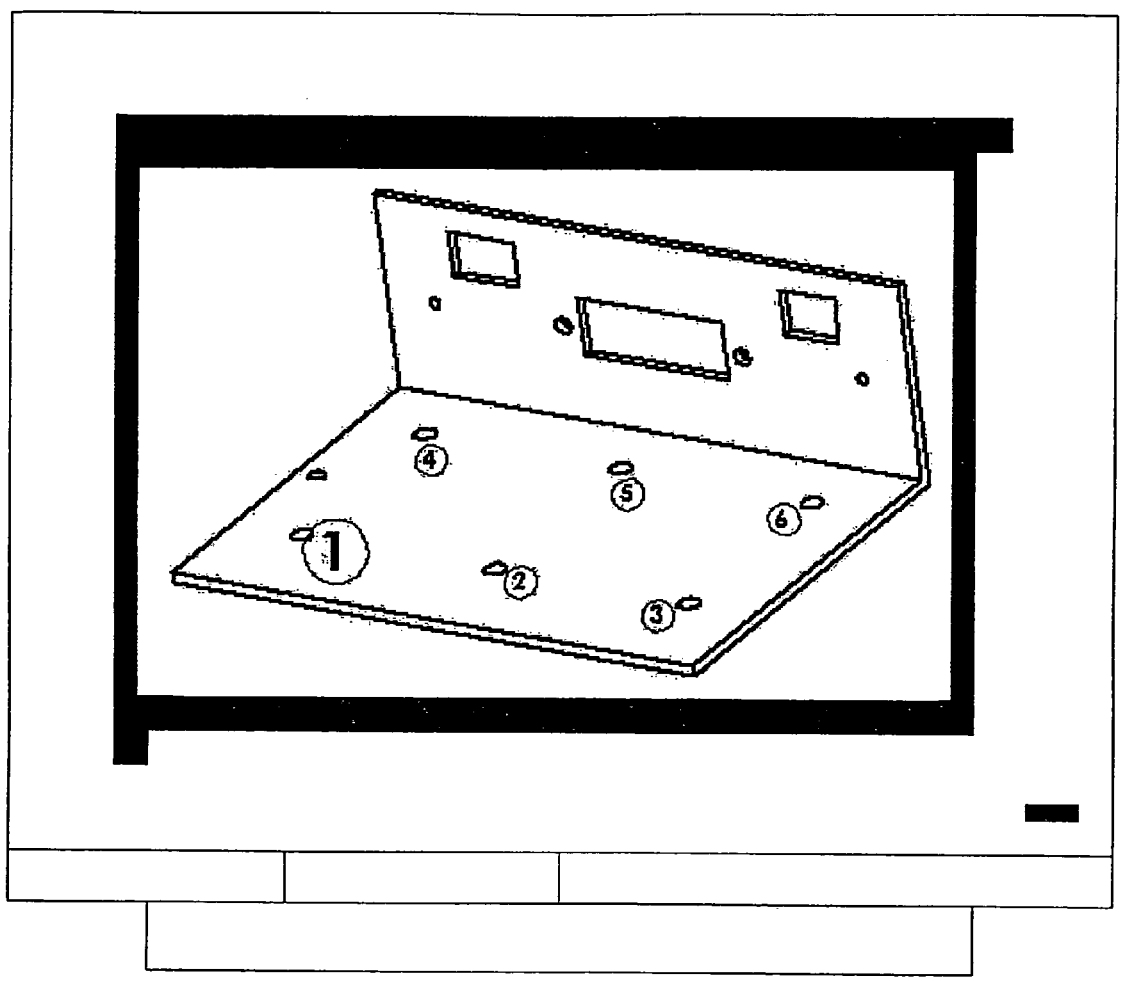
FIG. 3 is a view of the video display of FIG. 2 showing an exemplary superimposed object location identifier highlighted to show the location of the next fastener to be installed.

Once the fastener installation locations and sequence(s) are established, the system in operation will highlight the next fastener to be installed. This can be done by changing the color of the particular fastener symbol, causing the symbol to blink, enlarging its size, or other appropriate signals or combinations of signals, as shown by the exemplary enlarged numeral "1" in FIG. 3.

Figure 4:
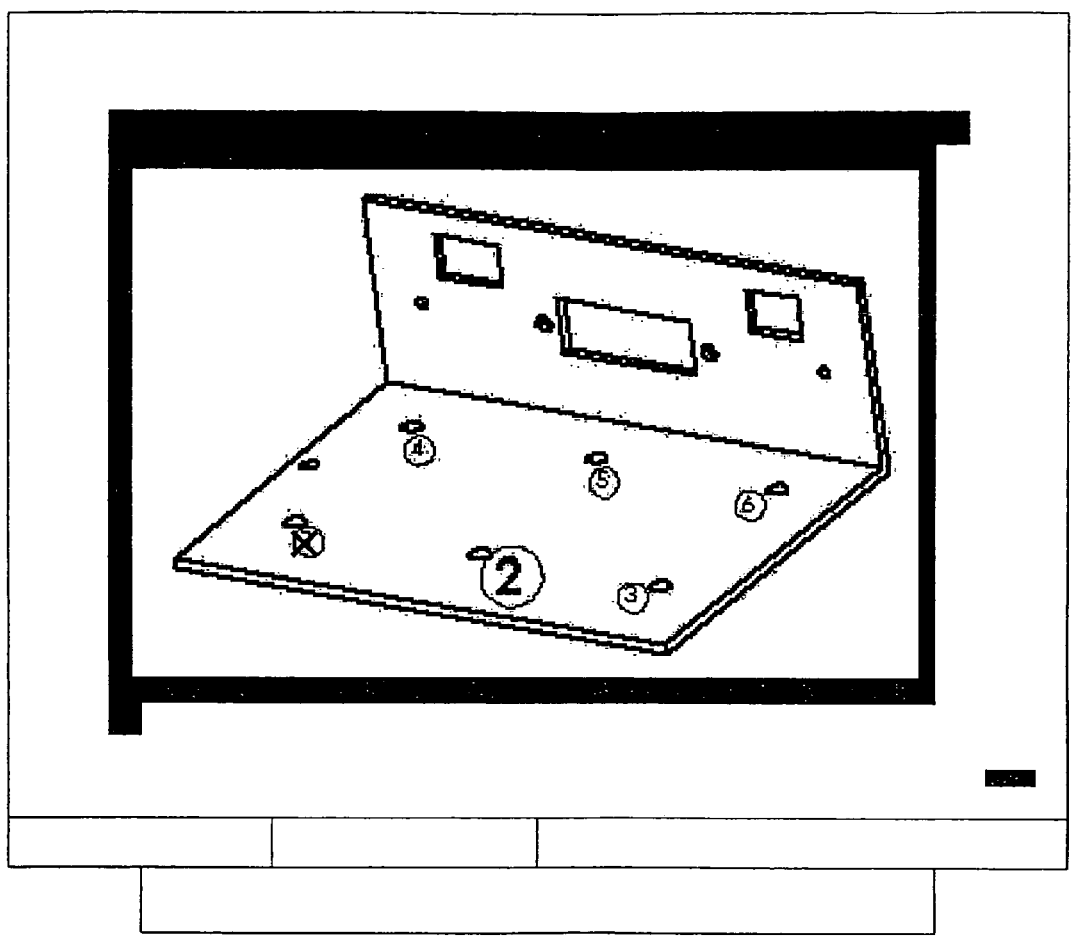
FIG. 4 is a view of the video display of FIG. 3 showing an advance from a first to a second exemplary superimposed object location identifier following a completed insertion signal from the machine.

FIG. 4 shows a completed insertion, as represented by an exemplary "X" over the completed installation location. FIG. 4 also shows the next location ("2") highlighted in such a manner to identify it to the operator. The computer system utilizes a signal received from the insertion machine itself to indicate a completed insertion, and advances the sequence and updates the display. When the sequence for one type of fastener is complete, all of the illustrated fastener symbols of that type on the image of the work piece will have changed (e.g., to an "X" or the like). The operator will then be guided in a similar fashion through the next steps in the process with other types of fasteners, if any. The user may reset, change and/or restart the sequence until it is satisfactory. Once the system receives (counts) signals from the machine indicating that all of the fasteners have been inserted, the image will show all locations as "inserted," and will then start over the cycle of insertions with a fresh work piece image illustrating that no fasteners have been inserted (e.g., FIG. 2).

Figure 5:
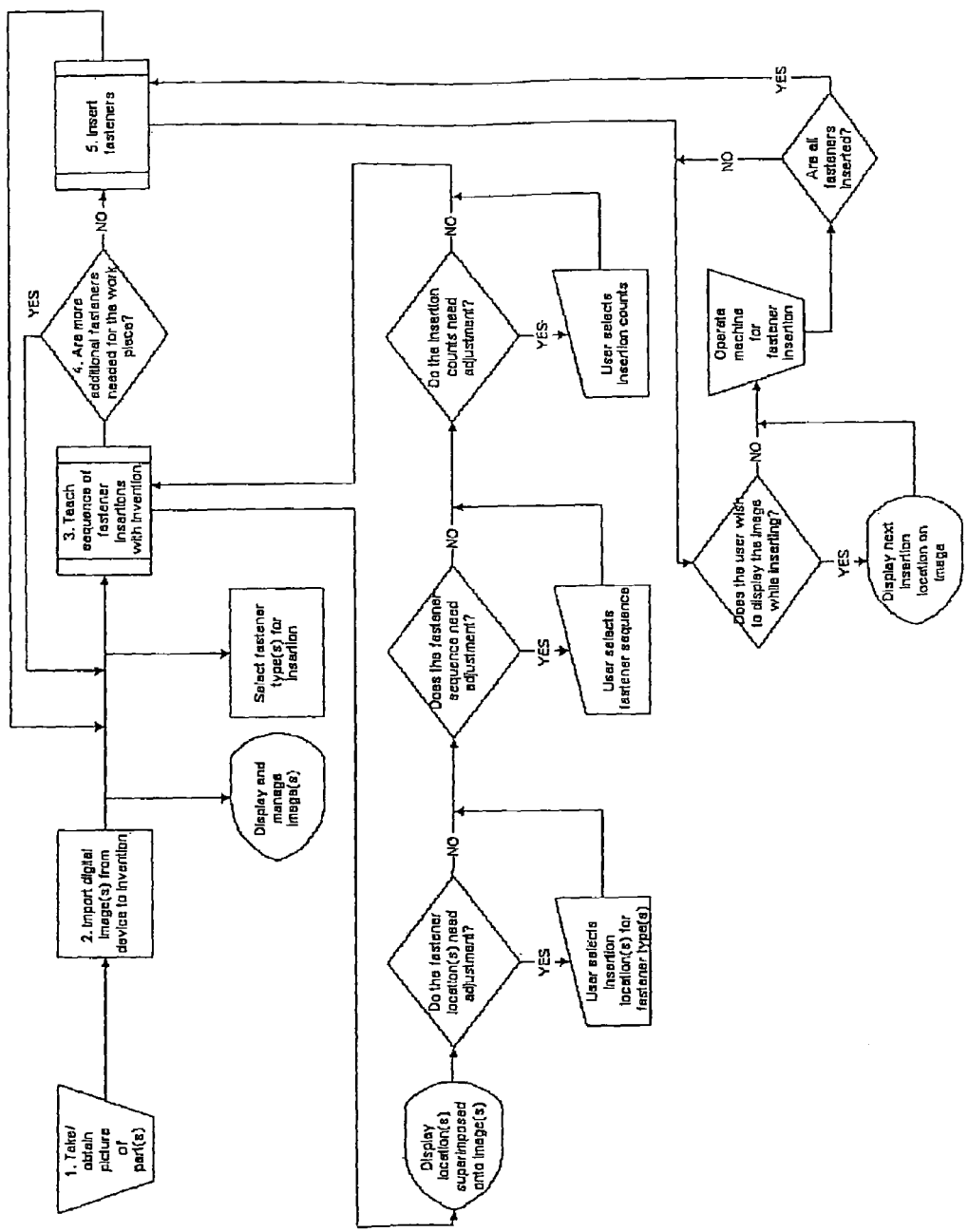
FIG. 5 is a flow-diagram showing operation of an embodiment of the present invention.

FIG. 5 is a flow-diagram illustrating one example of how the present invention may be used to achieve the novel benefits described above. From top left:

1. The process starts with the operator taking or obtaining a digital photograph image of a work piece(s).
2. Next, the digital image is uploaded to the software program and displayed for the operator to rename and manage with other existing/previously uploaded images.
3. The operator may then recall the image(s) once a fastener is selected for use, and individual locations for the fastener insertions can be superimposed or otherwise indicated over the image to indicate both the sequence and location of insertion, as earlier described. The operator may adjust the locations and sequence until they are satisfied with the representation of the fastener locations and sequence on the work piece.
4. If additional fasteners or fastener types are to be used, step 3 is repeated until all fasteners of all types have been identified and their respective sequences and locations are indicated in the software.
5. The operator then separately utilizes the setup of steps 1-4, and begins to insert the fasteners using the insertion machine and software program to guide them through each of the fastener locations and types specified earlier during the set-up of the program (steps 1-4). The operator may choose to use the display of the fastener location(s) on the image(s) or not, depending on their preference.

It is to be understood that variations and modifications of the present invention may be made without departing from the scope thereof. It is also to be understood that the present invention is not to be limited by the specific embodiments disclosed herein, but only in accordance with the final claims when read in light of the foregoing specification.

What is claimed is:

1. A process for establishing and confirming the completion of at least one operation to be completed on a workpiece using an image representative of the workpiece comprising the steps of:
  a. providing the image to a computer system;
  b. displaying the image on a video screen;
  c. identifying at least one location on the displayed image corresponding to at least one location on the workpiece where the at least one operation is to be completed on the workpiece by an associated machine;
  d. updating the image at each identified location prior to completion of an operation and displaying such updated image on the video screen;
  e. receiving at least one signal from the machine, such signal indicating completion of the at least one operation on the workpiece; and
  f. further updating the image at said at least one identified location in response to such signal to reflect the completion of at least one operation and displaying such further updated image on the video screen.

2. The process of claim 1 comprising the additional step of selecting a sequence for completing each such operation on the workpiece.

3. The process of claim 1 wherein the step of updating the image comprises superimposing a visual identification over the image at each identified location where an operation is to be completed.

4. The process of claim 1 wherein the step of updating the image is selected from the group of: changing the color at each location where an operation is to be completed, changing the size at each location where an operation is to be completed, and superimposing a symbol at each location where an operation is to be completed.

5. The process of claim 1 wherein the at least one operation to be completed on the workpiece comprises inserting a fastener.

6. The process of claim 1 wherein the at least one operation to be completed on the workpiece is selected from the group consisting of: folding the workpiece, bending the workpiece, cutting a hole in the workpiece, cutting the workpiece, pressing mechanical hardware onto the workpiece, and combinations thereof.

7. The process of claim 1 comprising the additional step of identifying at least one different location on the displayed image corresponding to at least one different location on the workpiece where at least one different operation to be completed on the workpiece.

8. The process of claim 7 wherein the operation to be completed on the workpiece comprises inserting a fastener of a first type, and the different operation to be completed on the workpiece comprises inserting a fastener of a different type.

9. The process of claim 1 wherein the additional step of further updating the image comprises superimposing a visual identification over the image at each location where an operation has been completed.

10. The process of claim 1 wherein the additional step of further updating the image comprises one of the group consisting of: changing the color at each location where an operation has been completed, changing the size at each location where an operation has been completed, and superimposing a symbol at each location where an operation has been completed.

11. A process for establishing and monitoring the insertion of a plurality of fasteners onto a workpiece using a computer system in communication with a fastener insertion machine and a video monitor comprising the steps of:
  a. importing an electronic image representative of the workpiece into the computer system;
  b. displaying the image on the video monitor;
  c. identifying a plurality of locations on the displayed image for inserting fasteners onto the workpiece;
  d. updating the image at a plurality of locations prior to insertion of any fasteners onto the workpiece and displaying such updated image on the video monitor;
  e. receiving a signal from the fastener insertion machine, said signal indicating completion of an insertion operation; and
  f. further updating the image in response to the signal to reflect the completion of the insertion operation and displaying such further updated image on the video monitor.

12. A process for monitoring the insertion of at least one fastener into a workpiece comprising the steps of:
  a. providing an image representative of the workpiece to a computer system that is in communication with a fastener insertion machine;
  b. displaying the image on a video display, said image including at least one identification of at least one previously-defined location for inserting said fastener onto the workpiece prior to insertion of any fasteners onto the workpiece;

c. receiving at least one signal from the fastener insertion machine following the insertion of said fastener; and d. updating the image at a previously-defined location upon receipt of each such signal and displaying such updated image on the video display.

13. The process of claim 12 comprising the additional steps of repeating steps "c" and "d" until all previously-defined locations have been updated.

14. A process for monitoring at least one operation to be completed on a workpiece using an image representative of the workpiece comprising the steps of:

a. providing the image to a computer system that is in communication with a machine;

b. displaying the image on a video display, said image including at least one identification of at least one location for at least one operation to be completed on the workpiece prior to completion of any such operation;

c. receiving at least one signal from the machine following the completion of an operation; and d. updating the image at an identified location where an operation has been completed upon receipt of each such signal and displaying such updated image on the video display.

15. The process of claim 14 comprising the additional steps of repeating steps "c" and "d" until all identified locations have been updated.

16. A computer readable medium comprising computer executable instructions wherein a computer performs the steps of:

a. importing an image representative of a workpiece into an image processing environment;

b. displaying the image on a video display;

c. identifying at least one location on the displayed image for at least one operation to be completed on the workpiece prior to completion of any such operation;

d. updating the image at each identified location and displaying such updated image on the video display;

e. receiving a signal from an associated machine, the signal indicating completion of at least one operation; and f. further updating the image at said at least one identified location in response to the signal to reflect the completion of the at least one operation and displaying such further updated image on the video monitor.

17. The computer readable medium of claim 16 wherein said instructions comprise the additional step of selecting a sequence for taking each such operation on the workpiece.

18. A process for establishing at least one location for insertion of a fastener onto a workpiece using a displayed image representative of the workpiece comprising the steps of:

a. providing the image to a computer system;

b. displaying the image on a video screen;

c. identifying at least one location on the displayed image corresponding to a location for inserting said fastener onto the workpiece prior to insertion of any fasteners onto the workpiece;

d. updating the image at each identified location and displaying such updated image on the video screen; and e. further updating the image at said at least one identified location in response to feedback received from an associated machine and displaying such further updated image on the video screen.

19. A process for monitoring the completion of at least one operation on a workpiece comprising the steps of:

a. loading the workpiece into a machine in communication with a computer system;

b. displaying a previously stored image representative of the workpiece on a video display of the computer system, said displayed image identifying at least one location where the at least one operation is to be completed on the workpiece by the machine prior to completion of such operation;

c. receiving feedback from the machine, such feedback indicating completion of the at least one operation on the workpiece; and d. updating the image at said at least one identified location in response to such feedback to reflect the completion of said at least one operation and displaying such updated image on the video display.

20. A process for monitoring the insertion of at least one fastener into a workpiece comprising the steps of:

a. loading the workpiece into a machine in communication with a computer system;

b. displaying a previously stored image representative of the workpiece on a video display of the computer system, said displayed image identifying at least one location where said fastener is to be inserted onto the workpiece by the machine prior to such insertion;

c. receiving feedback from the machine, such feedback indicating insertion of at least one fastener onto the workpiece; and d. updating the image at said at least one identified location in response to such feedback to reflect such insertion and displaying such updated image on the video display.

21. A process for establishing and monitoring the completion of a plurality of operations on a workpiece comprising the steps of:

a. providing an image representative of the workpiece to a computer system;

b. displaying the image on a video display;

c. identifying a plurality of locations on the displayed image for a sequence of operations to be completed on an the workpiece prior to completion of any such operations;

d. updating the image at each identified location and displaying the updated image on the video display;

e. receiving feedback from an associated machine, the feedback indicating completion of at least one operation; and f. further updating the image at said at least one identified location in response to the feedback to reflect the completion of the at least one operation.

22. The process of claim 21 comprising the additional steps of repeating steps "e" and "f" until all identified locations have been updated.

23. A computer readable medium comprising computer executable instructions wherein a computer performs the steps of:

a. providing an electronic image representative of a workpiece to an image processing environment;

b. displaying the image on a video display, said displayed image identifying at least one location for at least one operation to be completed on the workpiece prior to completion of any such operation;

c. receiving feedback from a machine following the completion of the at least one operation; and d. updating the image at each identified location where an operation has been completed upon receipt of such feedback and displaying such updated image on the video display.

24. The process of claim 11 comprising the additional steps of repeating steps "e" and "f" until all identified locations have been updated.

25. The process of claim 11 further comprising the step of setting up a sequence for completing each such insertion on the workpiece.

26. The process of claim 11 further comprising the step of identifying at least one different location on the displayed image corresponding to at least one different location on the workpiece where a fastener of a different type is to be inserted onto the workpiece.

27. A process for monitoring the completion of at least one operation on a workpiece comprising the steps of:
   a. loading the workpiece into a machine in communication with a computer system;
   b. displaying a previously stored image representative of the workpiece on a video display of the computer system, said displayed image identifying at least one location where at least one operation is to be completed on the workpiece by the machine prior to completion of such operation; and
   c. updating at least one identified location on the image as the machine completes each operation and displaying such updated image on the video display.

28. A process for monitoring the completion of at least one operation on a workpiece using a video display comprising the steps of:
   a. displaying a previously stored image representative of the workpiece on a video screen, said displayed image identifying at least one location on the workpiece where at least one operation is to be completed by an associated machine;
   b. receiving at least one signal from the machine, each such signal indicating completion of at least one operation on the workpiece; and
   c. updating the image at said at least one identified location in response to such signal to reflect completion of an operation at an identified location and displaying such updated image on the video screen.

29. A process for monitoring the insertion of at least one fastener on a workpiece using a video display comprising the steps of:
   a. displaying a previously stored image representative of the workpiece on the video display, said displayed image identifying at least one location on the workpiece where at least one fastener is to be inserted by an associated machine;
   b. receiving at least one signal from the machine, each such signal indicating insertion of at least one fastener on the workpiece; and
   c. updating the image at said at least one identified location in response to such signal to reflect insertion of said fastener at an identified location and displaying such updated image on the video screen.

30. A computer readable medium comprising computer executable instructions wherein said computer performs the steps of:
   a. displaying a previously stored image representative of a workpiece on a video display, said displayed image identifying at least one location on the workpiece where at least one operation is to be completed by an associated machine;
   b. receiving at least one signal from the machine, each such signal indicating completion of at least one operation on the workpiece; and
   c. updating the image at said at least one identified location in response to such signal to reflect completion of an operation at an identified location and displaying such updated image on the video screen.

31. A computer readable medium comprising computer executable instructions wherein a computer performs the steps of:
   a. displaying a previously stored image representative of a workpiece on a video display, said displayed image identifying at least one location on the workpiece where at least one fastener is to be inserted by an associated machine;
   b. receiving at least one signal from the machine, each such signal indicating insertion of at least one fastener on the workpiece; and
   c. updating the image at said at least one identified location in response to such signal to reflect insertion of said fastener at an identified location and displaying such updated image on the video screen.

32. A process for monitoring the completion of an operation on a workpiece using a monitor comprising the steps of:
   a. displaying a first previously stored image representative of said workpiece on said monitor, wherein said first image identifies at least one location on said workpiece where said operation is to be completed by an associated machine;
   b. receiving at least one signal from said machine, said at least one signal indicating completion of said operation on said workpiece; and
   c. displaying a second previously stored image on said monitor in response to said at least one signal, wherein said second image reflects the completion of said operation at said at least one identified location.

33. The process of claim 32, wherein said second image identifies at least one location on said workpiece where another operation is to be completed by said machine.

34. A process for monitoring the insertion of at least one fastener into a workpiece comprising the steps of:
   a. displaying one of a plurality of previously stored images on a monitor, each of said previously stored images representative of said workpiece, wherein said one displayed image identifies at least one location on said workpiece where at least one fastener is to be inserted by an associated machine;
   b. receiving at least one signal from said machine, said at least one signal indicating insertion of said at least one fastener on said workpiece; and
   c. displaying another of said plurality of previously stored images on said monitor in response to said at least one signal, wherein said other displayed image reflects insertion of said at least one fastener at said at least one identified location.

35. The process of claim 34, wherein said other image identifies at least one location on said workpiece where at least one other fastener is to be inserted by said machine.

36. A process for monitoring the completion of an operation on a workpiece using a monitor comprising the steps of:
   a. loading said workpiece into a machine in communication with a computer system;
   b. displaying a first previously stored image representative of said workpiece on said monitor, wherein said first image identifies at least one location on said workpiece where said operation is to be completed on said workpiece by said machine;
   c. receiving at least one signal from said machine, said at least one signal indicating completion of said operation on said workpiece; and
   d. displaying a second previously stored image on said monitor in response to said at least one signal, wherein said second image reflects the completion of said operation at said at least one identified location.

37. A process for monitoring the insertion of at least one fastener into a workpiece comprising the steps of:
   a. loading said workpiece into a machine in communication with a computer system;
   b. displaying one of a plurality of previously stored images on a monitor, each of said previously stored images representative of said workpiece, wherein said one displayed image identifies at least one location on said workpiece where at least one fastener is to be inserted by an associated machine;
   c. receiving at least one signal from said machine, said at least one signal indicating insertion of said at least one fastener on said workpiece; and
   d. displaying another of said plurality of previously stored images on said monitor in response to said at least one signal, wherein said other displayed image reflects insertion of said at least one fastener at said at least one identified location.

38. A computer readable medium comprising computer executable instructions wherein a computer performs the steps of:
   a. displaying a first previously stored image representative of a workpiece on a display, wherein said first image identifies at least one location on said workpiece where an operation is to be completed by an associated machine;
   b. receiving at least one signal from said machine, said at least one signal indicating completion of said operation on said workpiece; and
   c. displaying a second previously stored image on said display in response to said at least one signal, wherein said second image reflects the completion of said operation at said at least one identified location.

39. A computer readable medium comprising computer executable instructions wherein a computer performs the steps of:
   a. displaying one of a plurality of previously stored images on a display, each of said previously stored images representative of a workpiece, wherein said one displayed image identifies at least one location on said workpiece where at least one fastener is to be inserted by an associated machine;
   b. receiving at least one signal from said machine, said at least one signal indicating insertion of said at least one fastener on said workpiece; and
   c. displaying another of said plurality of previously stored images on said display in response to said at least one signal, wherein said other displayed image reflects insertion of said at least one fastener at said at least one identified location.

40. A method of performing a plurality of operations on a workpiece using a machine associated with a computer having a memory and a monitor, said method comprising the steps of:
   a. loading a plurality of images representative of said workpiece into said memory;
   b. loading said workpiece into said machine;
   d. observing one of said plurality of images on said monitor, wherein said observed image identifies at least one location on said workpiece where one of said plurality of operations is to be performed;
   e. performing said one of said plurality of operations on said workpiece using said machine, wherein said machine is configured to generate at least one signal on completion of said one of said plurality of operations; and
   f. observing an update to said monitor, wherein said update comprises one of the group consisting of: displaying another of said plurality of images on said monitor, superimposing a visual indication over said displayed. image at said at least one location, changing the color of said at displayed image at said at least one location, superimposing a symbol over said displayed image at said at least one location, and combinations thereof.

* * * * *

UNITED STATES PATENT AND TRADEMARK OFFICE
CERTIFICATE OF CORRECTION

| | | |
|---|---|---|
| PATENT NO. | : 7,698,010 B2 | Page 1 of 1 |
| APPLICATION NO. | : 11/240961 | |
| DATED | : April 13, 2010 | |
| INVENTOR(S) | : Jeff Cannedy et al. | |

It is certified that error appears in the above-identified patent and that said Letters Patent is hereby corrected as shown below:

Title Page, Line 5 Abstract: Replace "images of a work pieces." with --images of work pieces.--

Col. 2, Line 11: Replace "where and on the work piece" with --where on the work piece--

Col. 3, Line 1: Replace "symbols or other highlighting is used" with --symbols or other highlighting are used--

Col. 3, Line 24: Replace "likely than the operator" with --likely that the operator--

Claim 40 f: Replace "displayed.images" with --displayed images--

Signed and Sealed this

Twenty-second Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,698,010 B2 | Page 1 of 1 |
| APPLICATION NO. | : 11/240961 | |
| DATED | : April 13, 2010 | |
| INVENTOR(S) | : Jeff Cannedy et al. | |

It is certified that error appears in the above-identified patent and that said Letters Patent is hereby corrected as shown below:

Title Page, Line 5 Abstract: Replace "images of a work pieces." with --images of work pieces.--

Col. 2, Line 11: Replace "where and on the work piece" with --where on the work piece--

Col. 3, Line 1: Replace "symbols or other highlighting is used" with --symbols or other highlighting are used--

Col. 3, Line 24: Replace "likely than the operator" with --likely that the operator--

Col. 12, Lines 34-35 (Claim 40 f) Replace "displayed.image" with --displayed image--

This certificate supersedes the Certificate of Correction issued June 22, 2010.

Signed and Sealed this

Twentieth Day of July, 2010

David J. Kappos
*Director of the United States Patent and Trademark Office*